US010868372B2

(12) United States Patent
Huang et al.

(10) Patent No.: US 10,868,372 B2
(45) Date of Patent: Dec. 15, 2020

(54) CONNECTOR ASSEMBLY OF TWO LOW TEMPERATURE SUPERCONDUCTING CABLE TERMINALS AND MANUFACTURING METHOD THEREOF

(71) Applicant: Hefei Institutes of Physical Science, Chinese Academy of Sciences, Anhui (CN)

(72) Inventors: Xiongyi Huang, Anhui (CN); Yuntao Song, Anhui (CN); Kun Lu, Anhui (CN); Chen Liu, Anhui (CN); Chenlian Liu, Anhui (CN); Xinjie Wen, Anhui (CN); Linlin Fang, Anhui (CN)

(73) Assignee: Hefei Institutes of Physical Science, Chinese Academy of Sciences, Hefei (CN)

(*) Notice: Subject to any disclaimer, the term of this patent is extended or adjusted under 35 U.S.C. 154(b) by 0 days.

(21) Appl. No.: 16/487,493

(22) PCT Filed: Jun. 2, 2017

(86) PCT No.: PCT/CN2017/086915
§ 371 (c)(1),
(2) Date: Aug. 21, 2019

(87) PCT Pub. No.: WO2018/196099
PCT Pub. Date: Nov. 1, 2018

(65) Prior Publication Data
US 2020/0059017 A1 Feb. 20, 2020

(30) Foreign Application Priority Data
Apr. 26, 2017 (CN) .......................... 2017 1 0282268

(51) Int. Cl.
*H01R 4/68* (2006.01)
*G21B 1/21* (2006.01)
(Continued)

(52) U.S. Cl.
CPC ................. *H01R 4/68* (2013.01); *G21B 1/21* (2013.01); *H01R 4/021* (2013.01); *H01R 4/48* (2013.01); *H01R 43/02* (2013.01)

(58) Field of Classification Search
CPC .. H01R 4/68; H01R 4/02; H01F 6/003; H01B 12/02; H01B 12/04; H01B 12/06; H01B 12/08; H01B 12/10; G21B 1/21
(Continued)

(56) References Cited

U.S. PATENT DOCUMENTS 3,453,378 A * 7/1969 McInturff ............... H01L 39/02
174/94 R
4,794,688 A * 1/1989 Wada ...................... H01L 39/02
174/125.1
(Continued)

*Primary Examiner* — Peter G Leigh
(74) *Attorney, Agent, or Firm* — Bayramoglu Law Offices LLC

(57) ABSTRACT

A connector assembly of two low temperature superconducting cable terminals and manufacturing method thereof. A connector assembly comprises a copper layer having one side which is conducted with one low temperature superconducting cable and another side which is conducted with another low temperature superconducting cable, two welding material layers, wherein each welding material layer is provided between the copper layer and either of the two low temperature superconducting cable, and a clip mechanism covered the outer surface of either of the low temperature superconducting cable to tightly clamp the copper layer, the two welding material layers and the two low temperature superconducting cable form the inside to the outside of the connector assembly. The connector assembly of the present invention has compact structure. The saddle-shaped copper (Continued)

block is compressed by a clamp mechanism is use to weld with two low temperature superconducting terminals.

11 Claims, 7 Drawing Sheets

(51) Int. Cl.
    *H01R 4/02*     (2006.01)
    *H01R 4/48*     (2006.01)
    *H01R 43/02*     (2006.01)

(58) Field of Classification Search
    USPC .......................................................... 439/455
    See application file for complete search history.

(56) References Cited

U.S. PATENT DOCUMENTS

| | | | | |
|---|---|---|---|---|
| 5,111,574 A * | 5/1992 | Smathers | ................ | H01L 39/02 228/193 |
| 5,600,095 A * | 2/1997 | Dew | ...................... | H01L 39/02 174/125.1 |
| 6,583,351 B1 * | 6/2003 | Artman | ................... | H01R 4/68 174/15.5 |
| 7,067,739 B2 * | 6/2006 | Ashibe | ..................... | H01R 4/68 174/84 R |
| 7,094,973 B2 * | 8/2006 | Ashibe | ..................... | H01R 4/68 174/125.1 |
| 7,152,302 B2 * | 12/2006 | Morita | ................... | H01L 39/02 29/599 |
| 7,279,639 B2 * | 10/2007 | Ashibe | ..................... | H01R 4/68 174/125.1 |
| 7,547,846 B2 * | 6/2009 | Lallouet | ................ | H01R 4/625 174/84 R |
| 7,977,573 B1 * | 7/2011 | Painter | .................. | H02G 15/34 174/88 R |
| 7,999,182 B2 * | 8/2011 | Lallouet | ................... | H01R 4/68 174/88 R |
| 8,271,061 B2 * | 9/2012 | Lallouet | ............... | H01R 13/648 505/220 |
| 2011/0028327 A1 * | 2/2011 | Kodama | ................ | H01F 6/065 505/211 |
| 2011/0168428 A1 * | 7/2011 | Shibuya | ............... | H01R 43/048 174/125.1 |

* cited by examiner

CONNECTOR ASSEMBLY OF TWO LOW TEMPERATURE SUPERCONDUCTING CABLE TERMINALS AND MANUFACTURING METHOD THEREOF

FIELD OF THE INVENTION

The present invention relates to low temperature superconducting magnet and feeder technology, and more particularly to a connector assembly of two low temperature superconducting cable terminals and manufacturing method thereof.

BACKGROUND OF THE INVENTION

Magnetic-confinement thermonuclear fusion device conforms and utilizes a special form magnetic field to confine the superheated plasma body within the finite volume, which is in the state of thermo-nuclear reaction and consisted of the Light Atomic Nuclear, such as deuterium and tritium and so on, so as to control the superheated plasma body to release the energy stored in the Nucleus of Atoms. In order to acquire higher confinement magnetic field, in the fusion device, the superconducting magnets are generally wound by cable-in-conduit conductor, which is made by the low temperature superconducting wires, such as NbTi or $Nb_3Sn$, the steady operational current can reach to 10 KA magnitude. Due to the length limitation of the superconducting cable should be connected by a joint component with special configuration.

In the field of the magnetic confinement fusion, the relevant mature joint for the low temperature superconducting cable is "twin-box type" structure. The twin-box type joint has prepared to apply in the low temperature superconducting magnets system in the International Thermonuclear Experimental Reactor (ITER), For the twin-box type joint, the two low temperature superconducting cable terminals are compressed into the half joint boxes, which are machined by the copper-stainless steel clad plate. The low temperature superconducting wires are soldered with the copper in the boxes, then two prepared half joint boxes are lapped together and soldered again, finally the helium pipes on the joint boxes are welded connection via a jump pipe. Due to the complex configuration of the twin-box type joint, the high voltage insulation layer cannot directly be wrapped on the joint, so large quantity glass fiber reinforced epoxy fillers should be used to form a relevant regular shape for the insulation material wrapping. It is known that from above, after the final manufacture, the twin-box type joint has a large dimension (the overall length is about 1 m), and there are 3 different connecting interfaces in the joint, and each interface needs the individual soldering heating process, meanwhile, the high voltage insulation is difficult to manufacture. In China, the EAST superconducting Tokamak fusion experimental device has other joint structure for the low temperature superconducting cable. The joint is composed of two cable terminals pre-compressing in the copper tubes, the tubes are soldered together with the inner copper block. The maximum operational current of this joint is 13 kA, the joint resistance has high deviation, meanwhile, the joint insulation is made by the "wet-winding" technology or only the dry glass tape wrapping, which cannot be satisfied by the fusion device which needs higher dielectric requirement.

SUMMARY OF THE INVENTION

The object of the present invention is to provide a connector assembly of two low temperature superconducting cable terminals, wherein the connector assembly has compact structure and comprises a saddle-shaped copper block compressed by a clamp mechanism for welding with two low temperature superconducting terminals, an inner shell which is sealedly welded for communicating with a helium flowing pass for cooling the helium, and an outer shell which is sealedly welded, to overcome the shortages of joint magnetic-confinement thermonuclear fusion device in the prior art, such as large dimension, complicated structure, lower maximum running current, unstable resistance and insulating layer not satisfied higher voltage.

The present invention of the connecting assembly of two low temperature superconducting cable terminals comprises:

a copper layer, wherein two sides of copper layer are respectively provided the two low temperature superconducting cable terminals;

two welding material layers, each is provided between the copper layer and either of the two low temperature superconducting cable terminals; and a clip mechanism wrapped around the outer surface of the two low temperature superconducting cable terminals to tightly clamp the copper layer, the two welding material layers and the two low temperature superconducting cable terminals from the inside to the outside of the connecting assembly.

Each low temperature superconducting cable terminal comprises an original grounding shield layer part, an original exposed insulation part, a jacket exposed part and an exposed superconducting part. The two ends of the copper layer and the two welding material layer are respectively welded on the two ends of each low temperature superconducting cable terminal.

The copper layer comprises some saddle-shaped copper blocks, wherein the saddle-shaped copper blocks is successively arranged between the two low temperature superconducting cables along the axis of the two low temperature superconducting cables.

The copper layer comprises some Teflon shims inserted in the copper blocks to cut off the eddy current route between the copper blocks for reducing the AC loss induced in the copper blocks.

A stainless steel inner shell is provided on the external surface of the clamp mechanism, wherein each end of the inner shell and each jacket exposed part of the two low temperature superconducting cables are respectively welded together to form an internal sealing cavity to allow the liquid helium to flow from one low temperature superconducting cable terminal to the other low temperature superconducting cable terminal through the internal sealing cavity.

A stainless steel outer shell is provided on the external surface of the inner shell, wherein the two ends of the outer shell and the original grounding shield layer part of each low temperature superconducting cable terminal are respectively welded together to form external sealing cavity.

The clamp mechanism comprises a semicircular-shaped first clamp element and a semicircular-shaped second clamp element, wherein the inner shell comprises a first inner shell and a second inner shell sealedly welded with the first inner shell, wherein the outer shell comprises a first outer shell and a second outer shell sealedly welded with the first outer shell, wherein the first inner shell and the first outer shell are successively provided on the outside of the first clamp element, wherein the second inner shell and the first outer shell are successively provided on the outer side of the second clamp element.

Two sides of the external surface of the first clamp are symmetrically provided some first screw holes along the axis of the two low temperature superconducting cable terminals. The internal surface of the second clamp are symmetrically provided some second screw holes along the axis of the two low temperature superconducting cable terminals. Some hexagonal head bolts are screwed into the first screw holes and the second screw holes to connect the first clamp and the second clamp for tightly clamping and fixing the copper blocks, the two welding material layer and the two low temperature superconducting cable terminals inside of the clamp mechanism.

An inlet pipe and an outlet pipe are provided on the external surface of the outer shell, wherein the inlet pipe is used to inject resin to the surface of the inner shell to form a high-voltage insulating layer by heating and solidifying, wherein the outlet pipe is used to drain redundant resin and heat out of the connector assembly.

Manufacturing methods of a connector assembly of two low temperature superconducting cable terminals, includes steps:

compressing the exposed superconducting part of one low temperature superconducting cable terminal into a semicircular-shaped second clamp element, wherein a welding material layer is arranged on the surface of the exposed superconducting part, wherein another welding material layer and a copper layer is arranged on the surface of the welding material layer, then compressing the exposed superconducting part of another low temperature superconducting cable terminal into a semicircular-shaped first clamp element, and then fixing the first clamp element and the second clamp element, and then fixing and heating the first clamp element and the second clamp element to weld the exposed superconducting part of each of the two low temperature superconducting cable terminals.

In one preferred embodiment of the present invention, wherein the methods further include steps:

Providing two inner shell in the clamp mechanism, and sealedly welding two ends of the inner shell and each jacket exposed part of the two low temperature superconducting cable terminals to form an internal sealing cavity;

Providing two outer shell on the external surface of the inner shell, and sealedly welding the two ends of the outer shell and the end of each original exposed insulation part of the two low temperature superconducting cable terminals to form an external sealing cavity.

In one preferred embodiment of the present invention, the methods further include steps:

heating and solidify the resin which is injected in the external surface of the inner shell from the inlet pipe on the outer shell to form a high voltage insulation layer, wherein redundant resin and heat in the processes of resin heating and solidification flow out from on the external surface of the outlet pipe.

The positive effects of the present invention are:

The connector assembly of the two low temperature superconducting cable terminals and manufacturing method thereof in the present invention completely abandon the structure and manufacturing method of the twin-box type joint in the prior art, and have compact structure by compressing some saddle-shaped copper blocks in the clamp mechanism to weld with the low temperature superconducting cable. Furthermore, the AC loss of the connector assembly reduces by the some Teflon shims inserted between copper blocks. All welding is done with only one heat, effectively reducing the resistance and AC loss of the connector assembly. The inner shell forms an internal sealing cavity to allow the liquid helium to flow from one low temperature superconducting cable terminals to the other low temperature superconducting cable terminals through the internal sealing cavity.

The concept, the specific structure and the technical effects of the present invention will be further described in conjunction with the following drawings in order to fully understand the objects, features and effects of the invention.

DETAILED DESCRIPTION OF THE PREFERRED EMBODIMENTS

Figure 1:
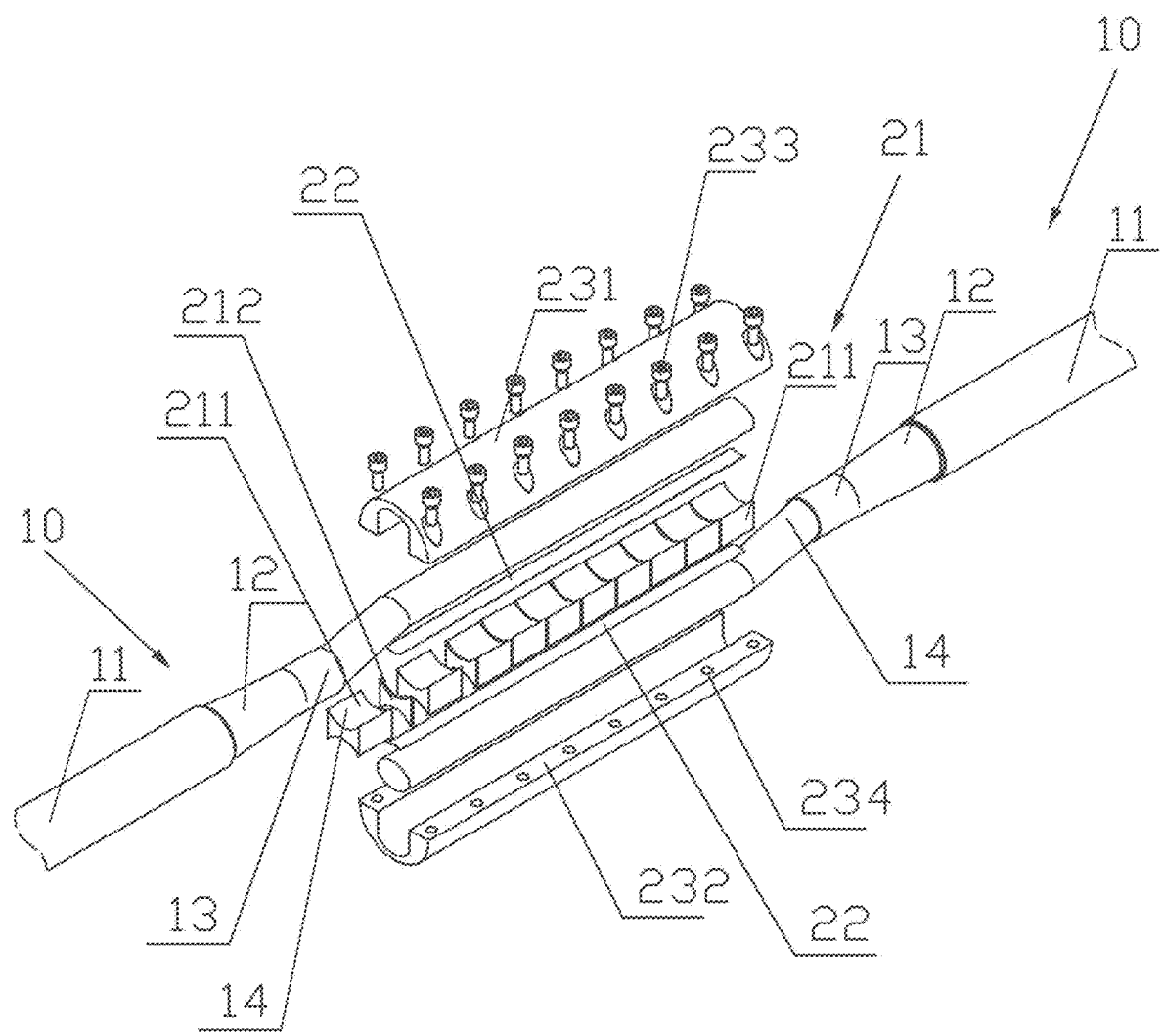
FIG. 1 is a schematic structural view of a connector assembly of two low temperature superconducting cable terminals.

Referring to FIG. 1 to FIG. 7, following contents will specially detail a connector assembly of two low temperature superconducting cable terminals.

Referring FIG. 1 to FIG. 5, in one embodiment, the connector assembly of two low temperature superconducting cable terminals comprises a copper layer 21 which is parallel to two low temperature superconducting cable terminals 10 that each the low temperature superconducting cable terminal is positioned at one side of the copper layer 21, two welding material layers 22 that each welding material 22 is provided between each low temperature superconducting cable terminals 10 and the copper layer 21, a clamp mechanism 23 which is wrapped on the external surface of the two low temperature superconducting cable terminals 10, an inner shell 24 which is provided on the external surface of the clamp mechanism 23 and an outer shell 25 which is provided on the external surface of the inner shell 24. Preferably, the inner shell 24 and the outer shell 25 is made of stainless steel material. The low temperature superconducting cable comprises an original grounding shield layer part 11, an original exposed insulation part 12, a jacket exposed part 13 and an exposed superconducting part 14. In one preferable embodiment, the connector assembly is applicable to connection of the low temperature superconducting cable with rate current 68 kA or even higher. The main parameters of each the low temperature superconducting cable terminal used in this disclosure are: Inner diameter×wall thickness: φ41×2 mm, the material of the jacket exposed part 13: 316L, the Number of the exposed superconducting part 14: 900, Number of copper wires: 522, Last stage twist pitch: 450 mm, the rate of Void fraction 35.2%. For other types of the low superconducting cable, the main dimension of the joint can be scaled as need.

Referring to FIG. 1, the copper layer 21 comprises some copper blocks 211 successively arranged between the two low temperature superconducting cable terminals 10 along the axis of the two low temperature superconducting cables 10. The copper layer 21 comprises some Teflon shims 212 inserted in the copper blocks 211 to cut off the eddy current route between the copper blocks 211 for reducing the AC loss induced in the copper blocks 211. The two ends of the copper layer 21 and the two ends of the two welding material layers 22 are welded on the two ends of the exposed superconducting part 14 of the two low temperature superconducting cable terminals 10. The clamp mechanism 23 tightly clamps the copper layer 21, two welding material layer 22 and the two low temperature superconducting cable terminals 10 in sequence. In one preferable embodiment, the saddle-shaped copper block 21 is selected C10200 coalesced copper material and the thickness is 43.2 mm. The thickness of the Teflon shims 212 is implemented 2 mm.

Figure 2:
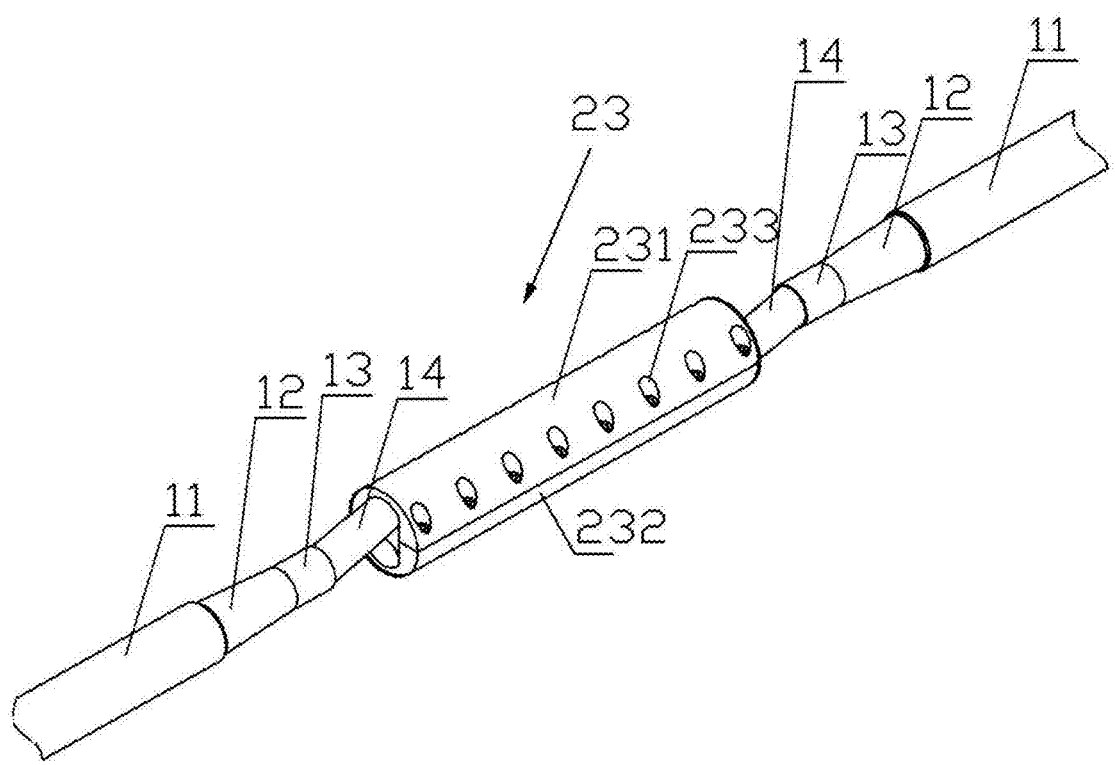
FIG. 2 is a first exploded view of the connector assembly of two low temperature superconducting cable terminals.

Referring FIG. 1 and FIG. 2, the clamp mechanism 23 comprises a semicircular-shaped first clamp element 231 and a semicircular-shaped second clamp element 232. Some first screw holes 233 are symmetrically provided on two sides of the external surface of the first clamp element 231 along the axis of the two low temperature superconducting cable terminals 10. Some second screw holes 234 are symmetrically provided on the two sides of the internal surface of the second clamp element 232 along the axis of the two low temperature superconducting cable terminals 10. Some hexagonal head bolts respectively screw in the first screw holes 233 and the second screw holes 234 to connect and fix the first clamp element 231 and the second clamp element 232 for tightly clamping the copper blocks 211, two welding material layer 22 and two low temperature superconducting cable terminals 10. In one preferable embodiment, the length of the first clamp element 231 and the second clamp elements 232 are also 450 mm, equal to the last stage twist pitch of the exposed superconducting part 14 of the two low temperature superconducting cable terminals 10. The void fraction of the two low temperature superconducting cable terminals 10 reduces to 21%-25% after compression by fixing the first clamp element 231 and the second clamp elements 232.

Figure 3:
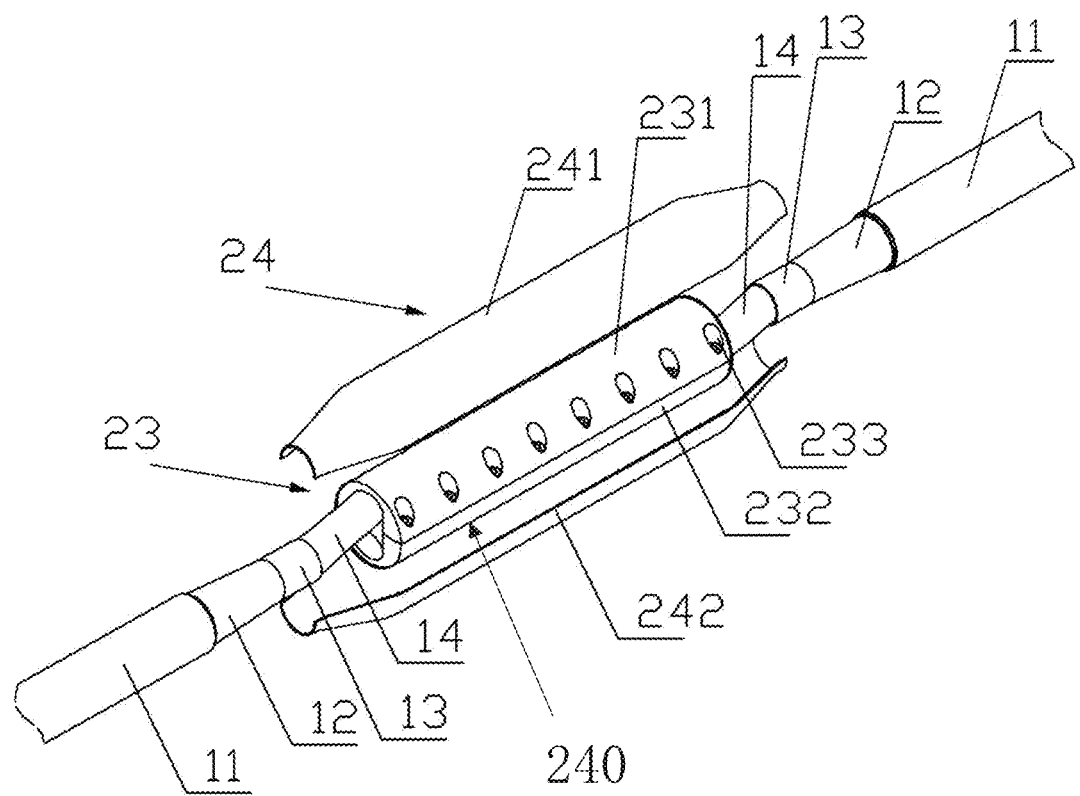
FIG. 3 is a second exploded view of the connector assembly of two low temperature superconducting cable terminals.
Figure 4:
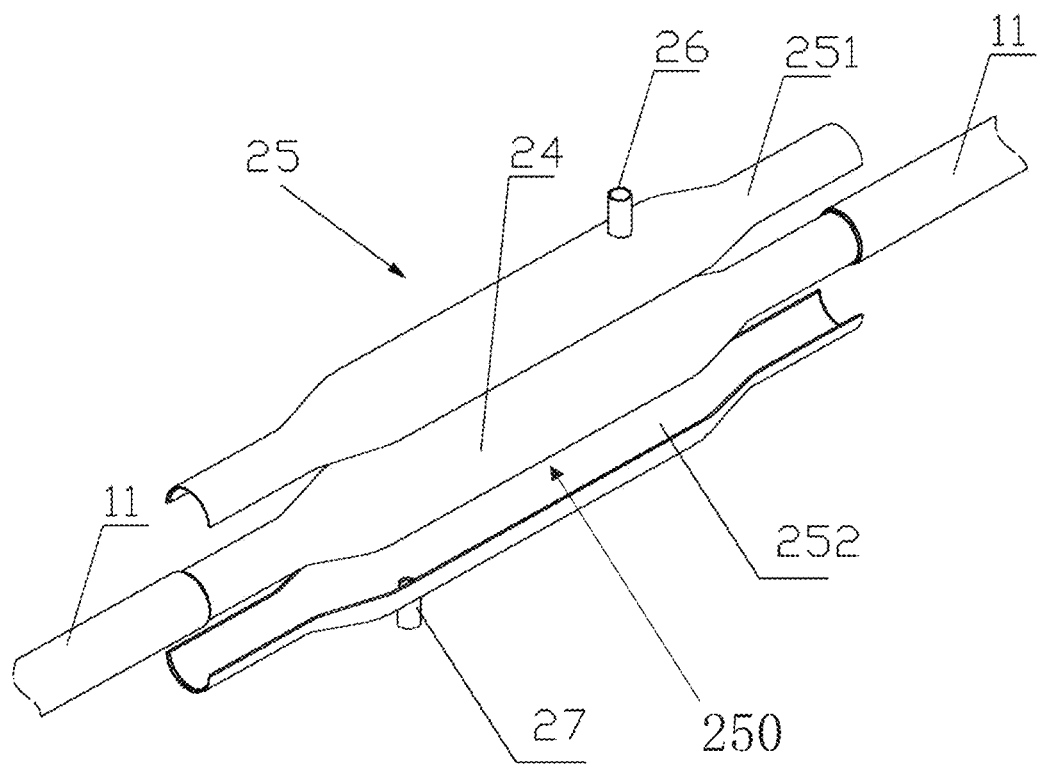
FIG. 4 is a third exploded view of the connector assembly of two low temperature superconducting cable terminals.
Figure 5:
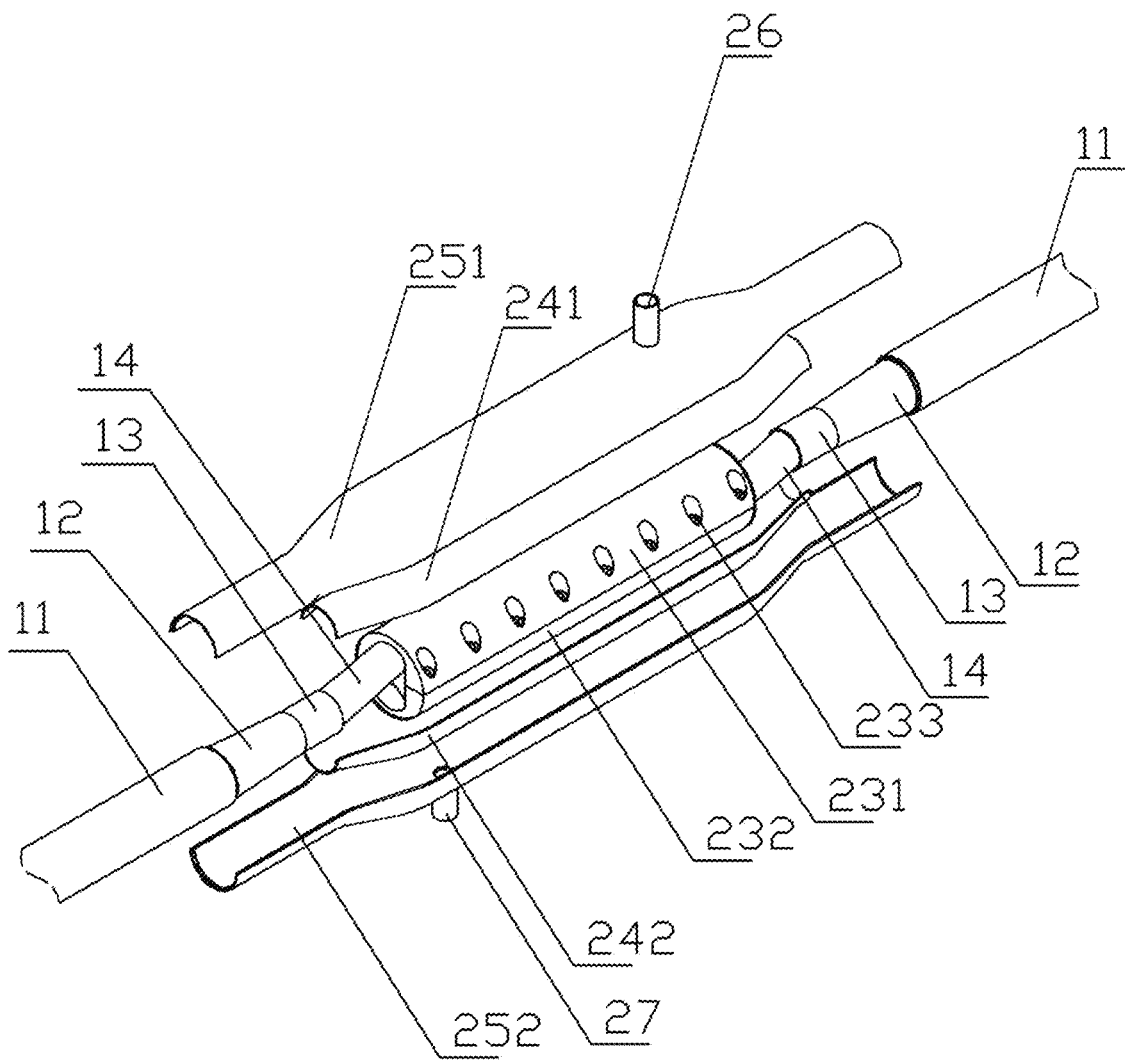
FIG. 5 is a forth exploded view of the connector assembly of two low temperature superconducting cable terminals.

Referring to FIG. 3 and FIG. 4, the inner shell 24 comprises a first inner shell 241 and a second inner shell 242 sealedly welded with the second inner shell 242. In one preferable embodiment, the length of the first inner shell 241 and the second inner shell 242 are also 640 mm. the thickness of the first inner shell 241 and the second inner shell 242 are also 2 mm. Referring to FIG. 5, the outer shell 25 comprises a first outer shell 251 and a second outer shell 252 sealedly welded with the first outer shell 251. The first inner shell 241 and the second outer shell 252 are successively provided on the first clamp element 231 from the inside to the outside of the first clamp element 231. The second inner shell 242 and the first outer shell 252 are provided on the second clamp element 232 from the inside to the outside of the second clamp element 232. The two ends of the inner shell 24 and each jacket exposed part 13 of the two low temperature superconducting cable terminals 10 are respectively welded together to form an internal sealing cavity 240 to allow the liquid helium to flow from one low temperature superconducting cable terminals 10 to the other low temperature superconducting cable terminals 10 through the internal sealing cavity 240. The stainless steel outer shell 25 is provided on the external surface of the inner shell 24. The two ends of the outer shell 25 and each original grounding shield layer part 11 of the two low temperature superconducting cable terminals 10 are respectively welded together to form external sealing cavity 250. In one preferable embodiment, the length of the first outer shell 251 and the second outer shell 252 are also 936 mm. The thickness of the first outer shell 251 and the second outer shell 252 are also 3 mm. The cross sectional diameter of the outer shell 25 composed of the first outer shell 251 and the second outer shell 252 is 110 mm. The actual length of the connector assembly is 640 mm. The connector assembly has two overlapping interface respectively welded with the two low temperature superconducting cable terminals by only one time of soldering process. The insulating part of the outer shell 25 after being sealedly welded are molded into a whole body by the processes of Vacuum Pressure Impregnating. The width of the connector assembly in this embodiment is reduce 30% and the length of the connector assembly is reduce 40% that is compared with the twin-box type joint of International Thermonuclear Experimental Reactor in the prior art which has the same load as the connector assembly so as to save the assembly space of the superconducting magnet and feeder system and reduce the theoretical direct-current resistance by 33% for better AC loss characteristics and promotion of withstanding voltage performance and mechanical strength of the connector assembly.

Figure 6:
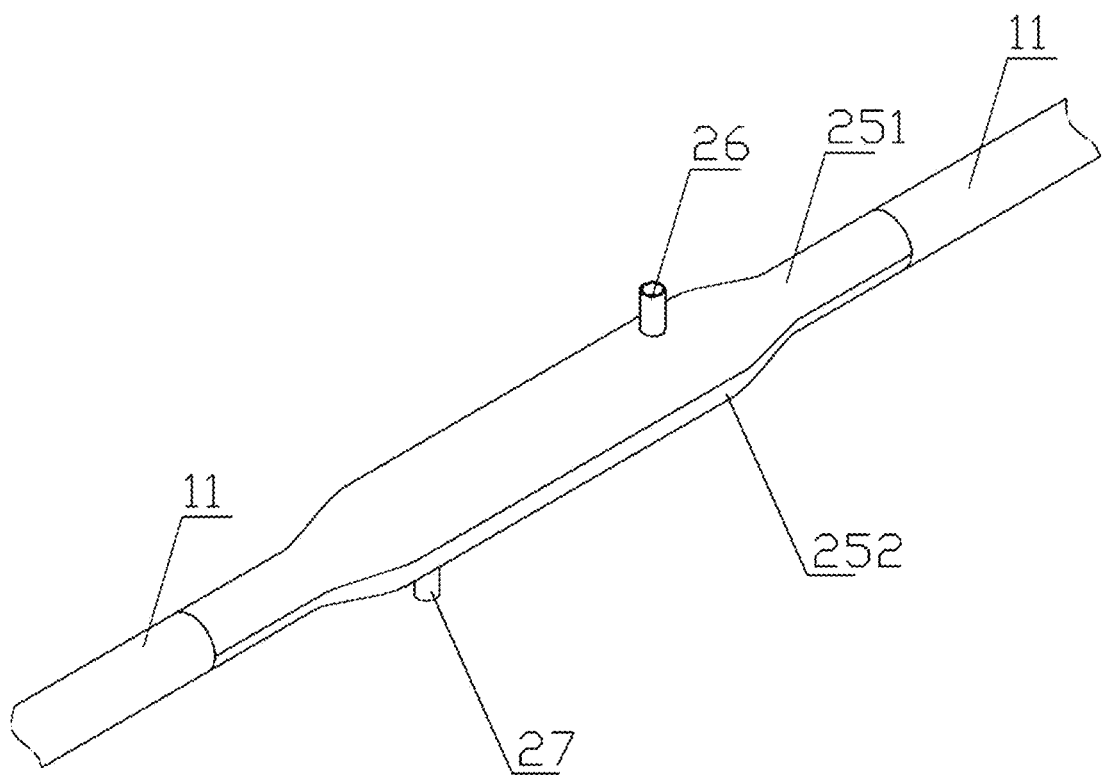
FIG. 6 is a fifth exploded view of the connector assembly of two low temperature superconducting cable terminals.
Figure 7:
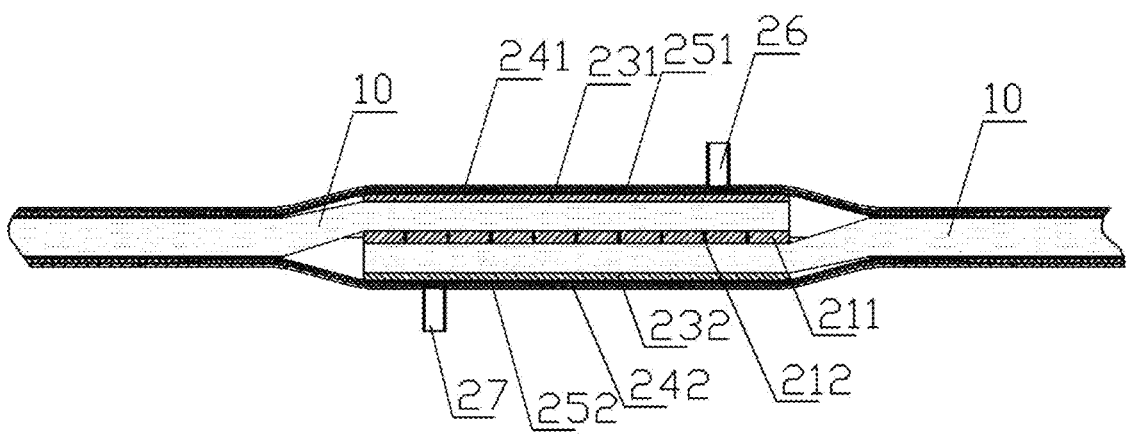
FIG. 7 is a cross-sectional view of the connector assembly of two low temperature superconducting cable terminals.

Referring to FIG. 6 and FIG. 7, an outlet pipe 26 is provided on the external surface of the first outer shell 251. An injection inlet pipe 27 is provided on the external surface of the second outer shell 252. The resin injected in the surface of the second inner shell 242 of the inner shell 24 from the injection inlet pipe 27 on the external surface of the second outer shell 252 solidifies by heating to form a new insulating layer. The new insulating layer and the original exposed insulation part 12 of the two low temperature superconducting cable terminals 10 are molded in a whole to connect with the outer shell 252 by the way of solidification to form a high voltage insulation layer of the entire connector assembly. The outer shell 252 is used as a grounding shield layer and protective layer when the Magnetic-confinement thermonuclear fusion device runs. Redundant resin and heat in the processes of resin heating and solidification flow out from the outlet pipe 26 on the external surface of the first outer shell 251.

The operating principle of a connector assembly for two low temperature superconducting cable terminals and manufacturing method include:

Step 1, respectively remove part of a jacket exposed part 13 of the two low temperature superconducting cable terminals 10 to form original grounding shield layer part 11, original exposed insulation part 12, jacket exposed part 13 and exposed superconducting part 14;

Step 2, compressing the exposed superconducting part 14 of one low temperature superconducting cable terminals 10 into a semicircular-shaped second clamp element 232, wherein the surface of the exposed superconducting part 14 is arranged a welding material layer 22, wherein the surface of the welding material layer 22 is arranged some saddle-shaped copper blocks 211, wherein there are some Teflon shims 212 arranged between the saddle-shaped copper blocks 211; compressing another exposed superconducting part 14 of one low temperature superconducting cable terminals 10 into the semicircular-shaped first clamp element 231, wherein the welding material layer 22 is provided on the surface which is far from the second clamp element 232. Some hexagonal head bolts screw in the first screw holes 234 and the second screw holes 234 to connect the first clamp element 231 and the second clamp element 232 for compressing the two low temperature superconducting cable terminals 10, two welding material layers 22 and the copper blocks 211 between the first clamp element 231 and the second clamp element 232, and then welding the two low temperature superconducting cable terminals 10 by heating the clamp mechanism;

Step 3, sealing welding a first inner shell 241 and a second inner shell 242 to form an inner shell 24 and sealing welding the two ends of the inner shell 24 and each jacket exposed part of the two low temperature superconducting cable terminals 10 to form an internal sealing cavity 240 to cover a whole welding area of two low temperature superconducting cable terminals 10;

Step 4, sealing welding a first outer shell 251 and a second outer shell 252 to form a outer shell 25 and sealing the original grounding shield layer part 11 of each low temperature superconducting cable terminals 10 to form external sealing cavity 250 to cover and clamp the original exposed insulation part 12 of the two low temperature superconducting cable terminals 10; and Step 5, heating and solidify resin injected in the surface of the second inner shell 242 of the inner shell 24 from the injection inlet pipe 27 on the external surface of the second outer shell 252 to form a new insulating layer and to mold in a whole with the original exposed insulation part 12 of the two low temperature superconducting cable terminals 10 to connect with the outer shell 252 by the way of solidification to form a high voltage insulation layer of the entire connector assembly for shielding the ground and structure protection, wherein the redundant resin and the heat in the processes of resin heating and solidification flow out from the outlet pipe 26 positioned on the external surface.

The various preferred embodiments of the invention have been described in detail above. It will be appreciated that many modifications and variations can be made for one skilled in the art without departing from the scope of the invention. Therefore, any technical solution that can be obtained by a person skilled in the art based on the prior art based on the prior art by logic analysis, reasoning or limited experimentation should be within the scope of protection determined by the claims.

What is claimed is:

1. A connector assembly of two low temperature superconducting cable terminals, comprising:
    a copper layer; two sides of the copper layer are respectively provided two low temperature superconducting cable terminals;
    two welding material layers, each is provided between the copper layer and either of the two low temperature superconducting cable terminals; and
    a clip mechanism wrapped around the outer surface of the two low temperature superconducting cable terminals to tightly clamp the copper layer, the two welding material layers and the two low temperature superconducting cable terminals from the inside to the outside of the connecting assembly; and
    wherein the copper layer comprises of a plurality of saddle-shaped copper blocks, wherein the saddle-shaped copper blocks are successively arranged between the two low temperature superconducting cable terminals along the axis of the two low temperature superconducting cable terminals.

2. The connector assembly of claim 1, wherein each one of the low temperature superconducting cable terminal comprises an original grounding shield layer part, an original exposed insulation part, a jacket exposed part and an exposed superconducting part, wherein the two ends of the copper layer and the two welding material layer are respectively welded on the two ends of each low temperature superconducting cable terminal.

3. The connector assembly of claim 1, wherein the copper layer comprises of Teflon shims inserted in the copper blocks to cut off the eddy current route between the copper blocks for reducing the AC loss induced in the copper blocks.

4. The connector assembly of claim 1, wherein the connector comprises a stainless steel inner shell provided on the external surface of the clamp mechanism, wherein each end of the inner shell and each jacket exposed part of the two low temperature superconducting cable terminals are respectively welded together to form an internal sealing cavity to allow the liquid helium to flow from one low temperature superconducting cable terminal to the other low temperature superconducting cable terminal through the internal sealing cavity.

5. The connector assembly of claim 4, wherein the connector comprises a stainless steel outer shell, wherein the two ends of the outer shell and the original grounding shield layer part of each low temperature superconducting cable terminal are respectively welded together to form external sealing cavity.

6. The connector assembly of claim 5, wherein the clamp mechanism comprises a semicircular-shaped first clamp and a semicircular-shaped second clamp, wherein the inner shell comprises a first inner shell and a second inner shell sealedly welded with the first inner shell, wherein the outer shell comprises a first outer shell and a second outer shell sealedly welded with the first outer shell, wherein the first inner shell and the first outer shell are successively provided on the outside of the first clamp, wherein the second inner shell and the first outer shell are successively provided on the outer side of the second clamp.

7. The connector assembly of claim 6, wherein two sides of the external surface of the first clamp are symmetrically provided with a plurality of first screw holes along the axis of the two low temperature superconducting cable terminals, wherein the internal surface of the second clamp are symmetrically provided with a plurality of second screw holes along the axis of the two low temperature superconducting cable terminals, the connector comprises of hexagonal head bolts screwed into the first screw holes and the second screw holes to connect the first clamp and the second clamp for tightly clamping and fixing the copper blocks, the two welding material layer and the two low temperature superconducting cable terminals inside of the clamp mechanism.

8. The connector assembly of claim 5, wherein the connector comprises an inlet pipe used to inject resin to the surface of the inner shell to form a high-voltage insulating layer by heating and solidifying and an outlet pipe provided on the external surface of the outer shell to drain redundant resin and heat out of the connector assembly.

9. A manufacturing method of a connector assembly of two low temperature superconducting cable terminals, comprising:
    compressing an exposed superconducting part of one low temperature superconducting cable terminal into a semicircular-shaped second clamp element, wherein a welding material layer is arranged on a surface of the exposed superconducting part, wherein another welding material layer and a copper layer is arranged on a surface of the welding material layer, then compressing an exposed superconducting part of another low temperature superconducting cable terminal into a semicircular-shaped first clamp element, and then fixing the first clamp element and the second clamp element, and then fixing and heating the first clamp element and the second clamp element to weld the exposed superconducting part of each of the two low temperature superconducting cable terminals.

10. The manufacturing method of claim 9, wherein the method further comprises:
   providing two inner shell in the clamp mechanism, and sealedly welding two ends of the inner shell and each jacket exposed part of the two low temperature superconducting cable terminals to form an internal sealing cavity; and
   providing two outer shell on the external surface of the inner shell, and sealedly welding the two ends of the outer shell and the end of each original exposed insulation part of the two low temperature superconducting cable terminals to form an external sealing cavity.

11. The manufacturing method of claim 10, wherein the method further comprises:
   heating and solidify the resin which is injected in the external surface of the inner shell from the inlet pipe on the outer shell to form a high voltage insulation layer, wherein redundant resin and heat in the processes of resin heating and solidification flow out from on the external surface of the outlet pipe.

\* \* \* \* \*